United States Patent [19]

Lieber

[11] 3,944,390
[45] Mar. 16, 1976

[54] WORKPIECE SURFACE AREA DETERMINATION

[75] Inventor: Hans-Wilhelm Lieber, Berlin, Germany

[73] Assignee: Fernsteuergerate, Kurt Oelsch KG, Berlin, Germany

[22] Filed: Dec. 13, 1973

[21] Appl. No.: 424,330

[30] Foreign Application Priority Data
Dec. 20, 1972 Germany............................ 2262300
June 14, 1973 Germany............................ 2330213

[52] U.S. Cl............. 23/230 R; 23/230 C; 204/129.2
[51] Int. Cl.².................. G01N 33/00; G01N 15/08
[58] Field of Search ...................... 23/230 R, 230 C; 204/129.2, 195 R, 1 T; 73/432 PS

[56] References Cited
UNITED STATES PATENTS

| | | | |
|---|---|---|---|
| 2,005,156 | 6/1935 | Meuhlberg........................ | 23/230 R |
| 2,457,234 | 12/1948 | Herbert et al. .............. | 204/129.2 X |
| 2,716,596 | 8/1955 | Robertson........................ | 23/230 R |
| 2,830,881 | 4/1958 | Wittrock........................... | 23/230 R |
| 3,464,796 | 9/1969 | Friedlander....................... | 23/230 R |
| 3,755,659 | 8/1973 | Bolhuis............................. | 73/146 X |

*Primary Examiner*—Morris O. Wolk
*Assistant Examiner*—Timothy W. Hagan
*Attorney, Agent, or Firm*—Spencer & Kaye

[57] ABSTRACT

A coating applied to a workpiece is removed therefrom and measured to determine the surface area of the workpiece.

28 Claims, 3 Drawing Figures

WORKPIECE SURFACE AREA DETERMINATION

BACKGROUND OF THE INVENTION

There is a real need for determining the surface area of workpieces, particularly for surface treatments, such as electroplating, anodizing, electrolytic plastic deposition or electrolytic immersion lacquering, so that current density, inter alia, can be set correctly. Previously-proposed methods to determine surface areas have found only limited acceptance in practice because they either lack required accuracy or are too complicated.

While the surface areas of standard pieces are listed in tables and are thus easily accessible, such surface area tables do not exist for workpieces of a more complex configuration. Nomograms exist for a number of simply shaped pieces but they likewise do not exist for more complex parts.

German Offenlegungsschrift No. 2,115,071 describes one method for determining surface area and also notes that quantity determinations can be effected analytically, for example by precipitation, titration and photometric or coulometric measurements, but fails to provide a more detailed description of steps to be taken in such processes; no such methods have thus far found acceptance in practice and obtained results have been rather imprecise.

SUMMARY OF THE INVENTION

In order to determine the surface area of a workpiece, the workpiece is initially covered with a removable chemical coating. The coating is then removed from the workpiece, and the surface area of the workpiece is calculated from the amount or quantity of the removed coating.

Lack in accuracy of prior attempts has been due, at least in part, to nonuniformity in applying a coating to and/or removing a coating from a workpiece. According to the present invention workpieces which do not contain homogeneous or smooth surfaces are chemically or electrolytically pretreated to obtain such surfaces before a coating is applied thereto. The coating is removed and/or, preferably, applied over a fixed period of time by immersing the workpiece in a solution in which material movement (mass transfer, e.g., of coating solids) is effectively diffusion controlled.

When a coating layer is formed on a workpiece surface by depositing material on the surface from a solution in which the workpiece is immersed, the layer is very uniform in thickness if movement of the material in solution is determined by diffusion, and convection plays an immaterial and/or subordinate role. Previously unavoidable greater build-up in coating thickness at different points on a workpiece (where flow conditions were more favorable than at other points) is avoided by the mode of operation of the subject invention.

An object of the present invention is to provide a method for determining the surface area of a workpiece having any shape. Another object is to provide a method which is capable of yielding such surface-area determinations with great accuracy. A further object is to provide a practical method which is not inordinately complex. Still further objects are readily apparent from the following description.

DESCRIPTION OF THE PREFERRED EMBODIMENTS

Figure 1:
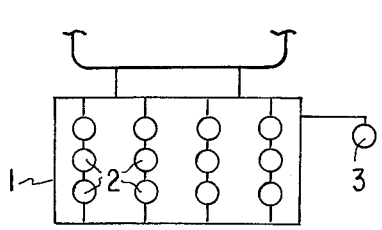
FIG. 1 is a schematic drawing of a rack with a plurality of workpieces thereon.

If a workpiece has one or more surfaces which are not smooth and/or uniform in texture, the workpiece is preferably initially pretreated in a chemical or an electrolytic polishing bath to smooth the surfaces so that they correspond to the geometric dimensions of the workpiece.

There are two possibilities for getting smooth surfaces:

1. chemical or electropolishing, by which a thin surface layer of the workpiece is dissolved under such conditions that the surface is made smooth;

2. electrolytic deposition of a metal from a levelling plating solution so that the roughness of the surface is eliminated.

A detailed description of chemical polishing is given in the ELECTROPLATING ENGINEERING HANDBOOK by A. K. Graham, 2nd Edition, 1962, Reinhold Publishing Corp., New York, pages 183–189. All other essential conditions, such as time, temperature, concentrations, ect., are therein presented.

A still more detailed description of electropolishing is given in the same book on pages 107 to 126.

Chemical or electropolishing requires solutions, the composition of which depends on the sort of material to be polished. Therefore, smoothing by deposition of a levelling metal deposit is sometimes more advantageous. Depositing a metal always gives a surface of the same properties. This is particularly important when the workpiece consists of two or more different metals or when it consists of plastic and glass, etc. All these materials can easily be plated after being made conductive chemically.

Plating to get a smooth surface is performed in the way described by A. K. Graham in the previously cited book.

For example, a workpiece consisting of mild steel, the surface of which is to be determined, has a surface area of about 1 $dm^2$ and a molded form. This workpiece is then degreased in an alkaline cleaner, rinsed, pickled in hydrochloric acid, rinsed and electroplated in a weak acid zinc solution containing 150 g/l of zinc chloride and 200 g/l of ammonium chloride. The weak acid zinc solution has a pH of 4.5, has a temperature of 25°C, contains 5 g/l of a condensation product of formaldehyde and naphthalenesulfonic acids and 2 g/l of a wetting agent. Electroplating is effected for 15 minutes with a current density of about 4 $A/dm^2$, i.e. a plating current of 4 A. The distance between the anodes (consisting of pure zinc) and the workpiece is at least 10 cm, and the applied voltage is about 5.5 volts. The plating solution is air-agitated. Thus the workpiece is uniformly plated with a levelled, mirror-bright zinc deposit.

The size of the workpieces is only limited by the dimensions of the plating tank. Every workpiece which can be plated can also be levelled by, for example, zinc plating. Only tubes which cannot be plated on their inner sides without auxiliary anodes need special precautions, for otherwise only the outside of such tubes would be plated and levelled. If there are e.g., hub-caps to be plated, the configuration of these articles made from stamped steel is rather complex because there are conical and curved areas with intricate stampings. For surface area determination these hub-caps are easily levelled by e.g., bright zinc plating, chemically coated, stripped, and the mass of the coating in the stripping solution is determined e.g., photometrically. These articles mostly have a surface area of between about 10 and 18 dm$^2$. If only the outside areas are to be measured, the inner surface areas are covered with a varnish before levelling and coating are performed.

Other articles of pressing importance at the present time are small and complex structures for electronic components which are to be plated with precious metals. The sizes of these articles are very different, there are small surfaces of a few squaremillimeters and large printed circuit boards the conductors of which have an area of more than one dm$^2$.

Watch cases, faces and hands mostly have complicated configurations and are to be gold plated. Therefore their surface areas are to be determined. If the hands of the watches are very small, e.g., 100 hands are connected with a thin wire of well known area and after the surface area determination has been performed the surface area of the wire is subtracted from the measured surface area which is then divided by 100. Thus also very small areas can be determined very exactly.

These examples could be continued.

A workpiece with uniformly smooth surfaces is immersed in a coating bath for a fixed period of time to form a coating on the workpiece surface. The coating configuration is controlled virtually entirely by diffusion. The thickness of the coating is thus essentially uniform over the entire surface of the workpiece.

In applying the present invention, use can be made of any suitable known coating bath capable of forming a coating of suitable thickness on the workpiece in a reasonable treatment time and under known conditions which assure that mass transfer within the coating bath occurs virtually entirely by diffusion.

As explained before, there are two possibilities for preparing a smooth surface of the workpiece:

1. chemical polishing or electropolishing. When the articles consist of electronegative metals, coating can be performed chemically or by displacement of a more noble metal, e.g., copper. When the article consists of steel and has a smooth surface, it can be dipped into a solution of, e.g., 10 g/l of sulfuric acid and 0.1 g/l of copper sulfate. In this solution a thin film of copper is formed on the workpiece at room temperature within a few seconds and any stirring of the solution should be avoided. Thus mass transfer in this solution is virtually entirely controlled by diffusion, for there are such small differences in density (specific gravity) of the solution that there is no natural convection possible. (See also above-cited A. K. Graham, pages 454 and 455).

Another mode of depositing a uniform coating consists of chemical reduction of ions on the workpiece which is described by G. Gutzeit in A. K. Graham's book on pages 464 to 479. These solutions, the compositions of which are given on pages 466 and 469, are used in a more diluted form because, in this way, the deposition speed is reduced, differences in specific gravity of the solutions formed at the surface of the workpiece are minimized and natural convection is suppressed. Also the processing steps and equipment described by G. Gutzeit are applicable for forming a uniform coating according to this invention.

2. When smoothing the surface is performed by electrolytic deposition of a levelling metal coating, displacement and chemical reduction can also be applied for coating the workpiece with a uniform layer.

Furthermore there is the possibility of applying a chemical deposit to the surface by conversion. This technique is described by C. W. Ostrander in A. K. Graham's ELECTROPLATING ENGINEERING HANDBOOK on pages 416 to 426. Conversion coating is a very advantageous way of forming a deposit because the deposition rate also decreases with increasing time of immersion. Thus reproducibility of the coating thickness is very good. Because conversion coatings are formed by chemical reaction of the metal surface with components of the solution mass transfer is virtually entirely controlled by diffusion, when there is no stirring or agitating of the solution. When a chromate treatment is applied on zinc, dip number 2, Type II, in Table I on page 420 of A. K. Graham's book can be used to form a uniform coating of a mixture of zinc chromate and chrome chromate on the zinc surface, the color of which is olive. The treatment steps and all other conditions are given by C. W. Ostrander in the abovecited book.

The conditions for achieving a coating operation are in accordance, e.g., with operation procedures described in A. K. Graham's book. This is important because the inventive method is primarily concerned with practical embodiments which can be applied in shops or laboratories having readily available equipment.

Mass transfer is effected by convection and by diffusion. Convective transfer must be suppressed; with it the thickness of any deposit is markedly enlarged at all edges and high spots of the workpiece surface, whereas recesses of the surface area are only coated with a thin layer. Though artifical convection effected by stirring and agitating the solution can be avoided, natural convection can be effected by differences in specific gravity of the solution adjacent the workpiece surface. This influence can be minimized by using dilute solutions (low reaction rate), by reducing reaction speed, by adding neutral salts, such as sodium sulfate or sodium chloride to the solution (higher viscosity and smaller differences in specific gravity of the solution adherent to the surface of the workpiece) and by adding colloidal substances, such as glue, agar agar or similar compounds to the solution.

Diffusion is effected only by differences in concentration, and when a coating is deposited nonelectrolytically mass transfer by diffusion is completely independent from the dimensions and configuration of the workpiece surface. When convection is suppressed, diffusion mass transfer and deposition rate have a decreasing velocity. This is an advantage because the more slowly the coating is deposited, the smaller are deviations from the desired uniform average thickness.

The coating is, e.g., a layer, the increase in thickness of which decreases markedly with time as soon as the layer on the workpiece is closed, i.e., the entire workpiece surface is covered.

When the coating is deposited by displacement, e.g., copper on steel, (A. K. Graham, page 455) the deposition rate is markedly decreased as soon as the surface is covered with the deposit, and further exchange of charges and deposition is possible only in the range of pores of the deposit. Therefore, the deposition rate nearly comes to a stop as the deposit becomes more and more dense.

When chemical reduction is applied, the deposition speed is only reduced due to the diffusion rate which decreases as the thickness of the liquid diffusion film increases, but the coating thickness still increases.

When conversion coating is performed, the increase in thickness of the layer is also decreased markedly as soon as a uniform coating is deposited because the layer is formed by reaction of the metal surface, e.g., zinc, with components of the solution, e.g., chromate ions.

In each of these examples coating thickness is preferably between 0.01 and 1.0 $\mu$m.

The period of time selected for applying the coating to the workpiece surface is not critical as long as it is sufficient to produce a sufficiently dense coating. A sufficiently dense coating is produced by displacement (e.g., copper on steel in acid solution) within a few seconds, preferably 20 seconds. Conversion coatings are produced within a period of between about a few seconds and a few minutes (A. K. Graham, page 420, Table 1). Coatings formed by chemical reduction take more time because uniform thickness without noticeable convection of the solution requires low reaction rates. Therefore, a time of about 10 to 100 minutes is necessary. The coatings are dense enough in every case when the thickness is at least 0.01 $\mu$m and the coatings have a uniform color.

The coating is applied, for example, by chromating, phosphating, burnishing, oxaling, immersion silver plating, immersion gold plating, immersion tin plating and immersion copper plating. A further alternative is to deposit the coating by chemical reduction so that the concentration gradient at the workpiece surface is too low to produce natural convection. The coating material concentration immediately adjacent the workpiece surface is maintained essentially uniform throughout coating deposition. The coating concentration replenishment adjacent the workpiece surface takes place practically only through diffusion. Chemical copper plating, chemical silver plating, chemical gold plating and chemical tin plating are examples of such processes.

For chromating, for example, a zinc-plated workpiece is immersed for, e.g. 100 seconds at room temperature in an acid solution, the pH of which is about 3.0 and which contains 5 to 20 g/l of chromic acid, about 5 g/l of chromium ions, a few drops of nitric acid and 20 g/l of acetic acid. In this way a uniform conversion coating, which is about 0.5 $\mu$m thick, is formed. During the time of immersion stirring of the solution is avoided.

For reductive deposition of a copper coating all operations are performed in the same way as described by G. Gutzeit in A. K. Graham's book on page 466. Using a more dilute solution, of course, brings about more uniform deposits because there is less natural convection due to lower reaction rates.

Chemical silver plating, e.g., on workpieces which consist of copper or are levelled by acid mirror-bright copper plating is performed with a solution from which silver is deposited by displacement. A solution which is well suited for this purpose is described by N. Hall on page 511 of the 1970 issue of the METAL FINISHING GUIDEBOOK DIRECTORY, edited by Metals and Plastics Publications, Inc., 99 Kinderkamach Road, Westwood, N.J., 07675. This solution works very well at room temperature and contains only 1 oz/gal of silver cyanide and 2 oz/gal of sodium cyanide. A trace of caustic soda is advisable for avoiding formation of hydrocyanic acid. Other formulations of solutions can be found in the literature or are proprietary solutions available on the market. Forming a silver deposit of about 0.1 $\mu$m thickness by displacement takes about 20 seconds time and comes to a stop after about 1 minute when a thickness of about 0.13 $\mu$m is obtained.

The deposited coating is removed with a solution having a composition which depends on the coating itself. A chromate layer is removed, for example, with a sodium base, e.g. an aqueous solution of 10 g/l of caustic soda; copper on chrome-nickel steel is removed, e.g., with ammonium persulfate; silver layers are removed, e.g., with nitric acid. If it is necessary or desirable to remove the coating in the preferred diffusion controlled manner, this may be realized, for example, by using the removing agent in the form of a foam or by increasing the viscosity of the removing agent. Known foaming or viscosity increasing agents are used for this purpose. A suitable foaming agent is, e.g., a wetting agent, such as sodium lauryl sulfate. A typical viscosity increasing agent is, e.g., glue, agar agar or polyvinyl alcohol.

A foam coating removing composition consists of, e.g., stripping solution, such as ammonimum persulfate, and is prepared by adding about 5 to 10 percent of the above-mentioned wetting agent and by injecting compressed air into this solution. This concentration of the wetting agent brings about formation of micelles and thus the convection inhibiting effect is a marked one.

Increasing the viscosity of a coating removing solution (stripping solution) is easily performed by dissolving, e.g., 2 percent by weight of polyvinyl alcohol in the solution. The polyvinyl alcohol powder is mixed with a small portion of the liquid to obtain a pulp; after about 1 hour this pulp is added to the rest of the solution; and after stirring for a few minutes, a clear liquid with a markedly higher viscosity results.

The quantity of the removed layer is then determined by a concentration measurement, for example, photometrically or direct-potentiometrically. The quantity of the removed layer is alternatively obtained by a mass determination, for example by titration, by precipitation or by a colorimetric measuring technique.

When the workpiece has been levelled, e.g., by bright zinc plating, and the coating applied to the workpiece consists of a chromate conversion layer, stripping of this layer is easily performed within 30 seconds by dipping the workpiece into a dilute solution of caustic soda. Thus a yellow chromate solution is formed, the amount of which is determined photometrically, potentiometrically or direct-potentiometrically, by a simple titration, by precipitation or by a colorimetric measuring technique. These measuring techniques are known and are, e.g., partly described by A. J. Vogel in his TEXTBOOK OF QUANTITATIVE INORGANIC ANALYSIS, 3d Edition, 1966, edited by Longmans, Green and Co., Ltd., London.

For the photometrical determination a defined volume of stripping solution is used for stripping the chromate coating from the workpiece. The optical density of this solution is measured with a spectral photometer and a light source of 366 nm. The result is proportional to the surface area. By using a workpiece the surface area of which is well known the graduation of the photometer is adjusted in such a way that the surface areas of an unknown workpiece can be read out directly from the instrument.

Potentiometric determination of the amount of chromate is performed by adding 10 ml of phosphoric acid to 100 ml of the stripping solution and titration is performed using a 1/50 normal solution of ferrous sulfate. For indication a platinum electrode is used, and a saturated calomel electrode is used as a reference electrode. At the equivalent point a potential drop from about 650 mv to about 420 mv is noted with a high impedance tube voltmeter. The consumption of the standard solution is proportional to the surface area of the workpiece.

Direct-potentiometric determination is performed using a silver-sensitive indication electrode instead of platinum and a silver nitrate standard solution instead of ferrous sulfate. During the titration silver chromate is precipitated until all chromate ions have formed insoluble silver chromate and then, by adding a small excess of silver ions, a voltage drop of about 150 mv is observed.

When titration of the stripping solution is to be performed with a visual indicator, 100 ml of the solution are acidified by addition of sulfuric acid, and a 1/50 normal solution of ferrous sulfate is used for titration. For indication of the equivalent point a small amount (a few drops of a 1 percent solution) of diphenylamine is added to the solution, which then has a blue color. At the equivalent point the color suddenly disappears. The comsumption of the standard solution is proportional to the surface area of the workpiece.

Precipitation is based on the fact that chromate forms salts of very low solubility with lead, barium, silver and mercury. The precipitation is performed after the stripping solution is weakly acidified with acetic acid by adding a solution of one of these metal ions to the sample. The quantity of the precipitate is proportional to the surface area of the workpiece.

A colorimetric measuring technique is performed with an electrical colorimeter using a filter of green color. A volume of, e.g., 10 ml of the stripping solution is diluted by a weak solution of sulfuric acid. A volume of 1 ml of an alcoholic solution of diphenylcarbazide, which forms a violet complex with chromate ions is then added to the acidic solution. After the solution is filled up to 100 ml, the density of the colored solution is measured. The density is proportional to the surface area of the workpiece.

There are many possibilities for applying these techniques to coatings other than chromate conversion coatings. Coatings of, e.g., copper are stripped with, e.g., a solution containing ammonia, tartaric acid and hydrogen peroxide. After stripping the copper, e.g., from a nickel surface, the excess of peroxide is eliminated by addition of a small amount of sodium sulfite. A spectral photometric determination of the copper content is then possible after addition of disodium dihydrogen ethylene diamino tetraacetic acid (EDTA) at a wavelength of 720 nm. For the potentiometric titration with this EDTA solution indication of the end point is performed with a solid state copper sensitive electrode and a saturated calomel electrode as a reference. Titration with visual indication is performed by titration with an EDTA standard solution using murexide as an indicator. The yellow solution suddenly becomes violet at the equivalence point. Copper is precipitated from the stripping solution electrolytically or, e.g., with oxinate, with hydrogen sulfide, with thionalid or with cupron.

Copper is alternatively determinated colorimetrically by using the blue color of the stripping solution which the copper has formed a tetrammine complex.

An advantageous modus operandi comprises coating from a solution in which the coating composition is formed so that movement of material takes place practically under diffusion control.

One preferable technique comprises smoothing the surface of the workpiece by levelling bright zinc plating and coating the workpiece by immersion into a chromate solution with a conversion layer. This technique is very simple and the deposition is virtually entirely diffusion controlled when, during chromating (100 seconds), the solution is not agitated. But other techniques mentioned above are also applicable.

Since a very uniform layer is formed in this manner, no special care is required when the layer is removed. Another technique for determining surface area comprises applying the layer to the workpiece surface with less care and then removing the layer under diffusion control. The effect required for measuring accuracy is fully utilized in this way. The quantity of coating layer so removed is a direct measure of the surface area of the workpiece. Both the application and the removal of the coating under diffusion control are recommended when great accuracy is required.

Exemplary embodiments of the present invention follow. These examples are presented solely for the purpose of illustration and in no way limit the nature or scope of the invention.

EXAMPLE 1

An odd-shaped workpiece (having approximate overall dimensions of 6 cm × 8 cm × 3 cm) forged of chrome-nickel steel is smoothed by anodic polishing to plane down the surface profile.

The polishing operation is performed in nearly the same way as described by C. L. Faust in A. K. Graham's book on pages 107 to 126, using a solution of 56 percent phosphoric acid, 12 percent chromic acid and 32 percent water, an anodic current density of about 20 A/dm$^2$, and a temperature of 60°C. The degreased specimen shows a bright surface after an exposition in the bath of about 5 minutes. The workpiece is then rinsed and dipped into dilute hydrochloric acid to remove an oxide film. Thereafter the workpiece is sequentially immersed in a palladium salt solution (e.g., consisting of 0.2 g/l of palladium chloride and 10 g/l of hydrochloric acid) for 1 minute. Then, without rinsing, it is dipped into a reduction agent solution (e.g., consisting of 20 g/l of stannous chloride and 50 g/l of hydrochloric acid) for 2 minutes in order to provide the surface uniformly with metal nuclei. The workpiece is then immersed for 60 minutes in a very weak, reductively acting copper-plating solution (e.g., 8 g/l of copper as sulfate, 100 g/l of rochelle salt, 20 ml/l of ammonia, 40 g/l of caustic soda, 40 ml/l of formaldehyde and 0.5 g/l of glue) with a deposition speed of only about 1 micron/hour ($\mu$/h). (The copper-plating solution, which is reductively acting, is operated just as described by G. Gutzeit in A. K. Graham's book on page 466, Table 2, Solution II, and the deposition rate is only about 1 $\mu$m per hour. For stabilization of the solution addition of 0.5 g/l glue is quite useful.) The copper is then removed from the copper-plated workpiece in 100 ml of an aqueous solution containing 120 ml/l of ammonia, 20 g/l of tartaric acid and 5 ml/l of hydrogen peroxide. After about 1 minute, depending on the thickness of the copper deposit, the copper coating is completely removed from the workpiece surface; 2 g of sodium sulfite are then added to the aqueous copper-removing solution to remove any excess peroxide from the stripping solution. Thereafter the solution is photometered at 720 nm. The measured extinction, optical density or absorbance, is a direct measure of the workpiece surface area.

Determination of the optical density of a stripping solution is performed, e.g., with a one-beam spectrophotometer with high quality filters for 720 nm and a photoelectric cell sensitive to red light. The photometer has a digital read-out and a voltage divider for adjustment of the amplifier. It is thus possible to obtain a signal of 100.0 digits for a specimen of 100 cm² surface area. After this calibration the forged workpiece gives a result of, e.g., 183.2 cm².

Because the photometer amplifier is calibrated by using a specimen of well-known surface area, which was prefinished, coated and stripped in the same way as the workpiece to be measured, there is no need for any calculations.

EXAMPLE 2

An odd-shaped cold-forged belt steel workpiece is provided with a zinc coating of approximately 15 $\mu$ (1 $\mu$ or micron equals $10^{-6}$ meter) thickness in a weakly acid (pH 4.5) zinc-plating bath (temperature — 25°C; current density - about 4 A/dm²; agitation by air injection) having the following composition:

| | |
|---|---|
| zinc chloride | 150 g/l |
| ammonium chloride | 200 g/l |
| brightener and leveller (condensation product of formaldehyde and naphthalenesulfonic acids) | 5 g/l |
| wetting agent | 2 g/l |

Thereafter olive chromation is effected on the workpiece by immersing it for 100 seconds in a bath (room temperature; no stirring; pH - about 3.0) composed of:

| | |
|---|---|
| chromic acid | 15 g/l |
| chromium ions | 5 g/l |
| nitric acid | 1 ml/l |
| acetic acid | 2 g/l |

The chromate layer coated on the workpiece is removed therefrom by immersing the thus treated workpiece for about 30 seconds in 100 ml or 1 percent (w/v) aqueous sodium hydroxide. The thus obtained solution (with the removed chromate layer) is then photometered at 366 nm. The measured optical density is a direct measure of the workpiece surface area.

Photometric measuring is performed with a one-beam spectral photometer with a tungsten lamp as a light source, a high quality spectral filter for 366 nm, a photoelectric cell sensitive to blue light, a digital read-out for optical density and a cuvette of 1cm length (or thickness). Calibration is effected by using a specimen of 100 cm² and by adjusting the read-out to 100.0 digits with a voltage divider for setting the amplification factor. Then the yellow stripping solution of the belt steel workpiece is measured. The result is 75.2 cm². There is no calculation necessary because of the adjustment on the base of a specimen of well-known surface area.

A further aspect of the present invention permits the determination of the total surface area for workpieces (accommodated on a common rack) of different sizes, shapes and numbers. This is accomplished by initially coating the workpieces (fastened to the rack) together with a pilot sample having a known surface area. The coatings on the workpieces and on the pilot sample are then removed in separate removal baths of the same composition and of known volumes. Thereafter the concentration (in the removal bath) of the layer removed from the pilot sample is used as a reference value for calibrating (in surface area units) the measuring instrument serving to determine the quantity of the layers removed from the workpieces. The concentration (in the removal solution) of the coating layer removed from the workpieces is then measured, yielding a direct indication (from the calibrated measuring instrument) of the total workpiece surface area.

The advantages of the present invention are that the total surface area of workpieces of any desired size, shape and number (attached to a common rack) is determined in a rapid and simple manner with the greatest accuracy. A change in operating conditions, i.e., for example, a change in immersion time, pH, temperature or the concentration of the coating solution, is automatically detected so that duplication of measuring results is assured.

With reference to the drawings, a rack, jig or carrier 1 has a number of workpieces 2 (which have any desired shape) fastened to it. A pilot sample 3 with a known surface area is also attached to rack 1.

In order to determine the surface area of workpieces 2 attached to rack 1, the workpieces 2 and the pilot sample 3 are initially provided with a practically contour-free surface by electrolytic treatment.

Such a treatment is, e.g., levelling bright zinc-plating from a noncyanide, air-agitated solution, operated at room temperature, and containing 150 g/l of zinc chloride, 200 g/l of ammonium chloride, 2 g/l of a wetting agent and 5 g/l of a condensation product of formaldehyde and naphthalene sulfonic acids as a brightener and leveller. The pH of this electrolyte should be about 4.5 and the average current density is 4 A/dm². The anodes consist of pure zinc and the distance between the cathode and anode should be at least 10 cm.

The electrolytic treatment step is omitted when the surfaces of the workpieces already exhibit a uniform microrelief or the true surface is of interest. Thereafter the workpieces and the pilot sample are rinsed. Then the rack with the workpieces and the pilot sample is immersed into vessel 4 containing a coating solution so that a uniformly thick coating layer is formed on the workpieces and on the pilot sample.

The coating solution is any solution suitable for this purpose. When the workpieces and pilot sample are composed of zinc or are zinc-plated, a suitable coating solution (pH - about 3.0; room temperature; no stirring or air injection) is composed of, e.g., 15 g/l of chromic acid, 5 g/l of chromium ions (trivalent), 1 ml/l of nitric acid and 20 g/l of acetic acid.

Figure 2:
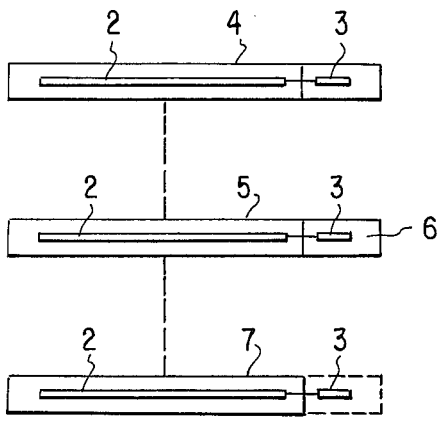
FIG. 2 is a schematic top view of immersion baths.

After a further rinsing in, e.g., fresh water in the usual way in a water tank (cf. further information provided by H. L. Pinkerton in A. K. Graham's book on pages 705 to 715), rack 1 is immersed in two separate vessels, 5 and 6, so that workpieces 2 enter vessel 5 and pilot sample 3 enters vessel 6. Both vessels contain the same removal (stripping) solution, e.g., one composed of 1 percent (w/v) of aqueous caustic soda (sodium hydroxide) and the volumes of the two vessels are known. Workpieces and pilot sample remain in the removal solution for some time, i.e. until the coating is removed from the workpieces, are then removed from vessels 5 and 6 and are put into further vessels 7, which need only accommodate the workpieces, for subsequent desired surface treatment. For simplicity only three treatment stages are shown in FIG. 2; rinsing steps, for example, were not considered.

The present invention requires only slightly more steps than conventional coating processes. Thus, for example the following 26 process steps are required for gold-plating workpieces of a non-noble basic material, such as steel:

Placing the workpieces onto a rack, degreasing, rinsing, pickling, rinsing, electrocleaning (degreasing), rinsing, acid dip, rinsing, copper strike, rinsing, acid dip, rinsing, bright copper-plating, rinsing, acid dip, rinsing, bright nickel-plating, rinsing, acid dip, rinsing, gold-plating, reclaim rinsing, rinsing, drying, removal of the workpieces from the rack.

For the determination of the surface area of the workpieces the following six additional process steps are required: equalizing, rinsing, coating, rinsing, removal or coating, rinsing. These can be incorporated in the process sequence without difficulty and without noticeable additional expenditures.

Equalizing is necessary to obtain a uniform roughness or profile of the surface, because there is a remarkable difference between the true surfaces of an unfinished, uneven, coarsegrained workpiece and a smooth, bright, levelled one the dimensions of which are the same. Whereas a dull silver deposit can have a true surface 50 times greater than the geometrical surface (product of length and width), many technical surfaces (abrasive finished, abrasive blasted metals, pickled metals) have true surfaces 2 to 5 times larger than the geometrical ones.

Therefore, polishing or levelling is necessary to obtain a surface which has a uniform, smooth, reproducible microrelief which is free of contours under the scanning microscope. Only these conditions make possible exact reproducibility of surface area determination.

After removing the coatings from workpieces 2 and from pilot sample 3, the concentration of the coating material in the removal solution contained in vessels 5 and 6 is measured, e.g., as follows:

The transmission (transparency) of both solutions is measured photometrically with the aid of photocells (not shown) as light receivers. The measured signals are then amplified by amplifiers 8 and 9 and are subsequently converted by lin/log converters 10 and 11 to the corresponding optical densities, which are linearly proportional to the respective concentrations. The photometrically measured transmission has a logarithmic relationship to the optical density, which relationship is provided between the input and output of the lin/log converters 10 and 11. The relationship between transmission D and optical density E is mathematically represented as follows:

$$D = \frac{\text{intensity of transmitted light (behind the cuvette)}}{\text{intensity of incident light (in front of the cuvette)}} = \frac{J}{J_0}$$

$D = J/J_0$ is also equal to $10^{-E}$, where E is the extinction or optical density. Therefore $E = -\log D = \log 1/D \; (= \log {}^{I}O/I)$, and when D is measured in percent, $E = \log 100 - \log D\%$, or $E = 2 - \log D\%$ (This equation is the basic formula for photometric measurements.) The measured transmission D has to be converted into optical density E, and E is a linear function of the concentration c:

$E = k \cdot c$ where $k$ is a factor containing the length of the cuvette and the extinction coefficient for the wavelength of the employed monochromatic light. Since c is proportional to the surface area, measuring of E gives a direct reading of the surface area.

The optical density of the solution from workpieces 2 is marked $E_x$, that of the solution from the pilot sample 3 is marked $E_L$. The optical density values $E_x$ and $E_L$ are fed to a quotient former 12 which forms the quotient of $E_x$ and $E_L$. Since the surface area $A_x$ of the x workpieces follows the equation $$A_x = A_L \cdot \frac{V_x}{V_L} \cdot \frac{E_x}{E_L}$$

and the surface area $A_L$ of the pilot sample as well as the volumes $V_x$ of vessel 5 and $V_L$ of vessel 6 are known, and the surface area $A_x$ of the workpieces is proportional to the quotient of $E_x$ and $E_L$, a direct indication in surface area units results at the measuring instrument 13 if the factor $$k = A_L \cdot \frac{V_x}{V_L}$$

had previously been set at potentiometer 14. In addition to an analog indication at the measuring instrument 13, a digital display in indicator device 16 is possible if an analog/digital converter 15 in connected. Instrument 13 could be any suitable type of voltmeter.

Figure 3:
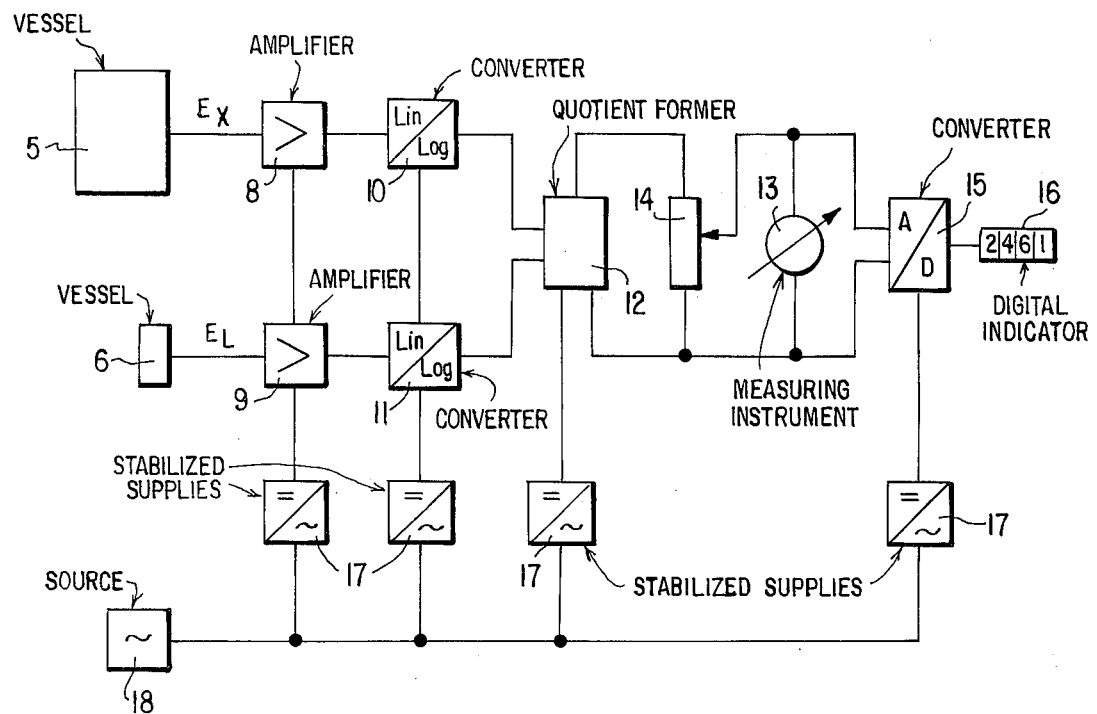
FIG. 3 is a block circuit diagram for a measuring circuit to determine the surface area of workpieces disposed on the rack.

Devices 8 – 12 and 14 are supplied with operating power from source 18 via stabilized power supplies 17. All of the signal processing components of the arrangement of FIG. 3 can be constituted by well-known commercially available devices.

An alternative for the photometric concentration measurement is a direct-potentiometric measurement. In such case a measuring signal is obtained which has a logarithmic relationship to the ion activity. Thus the photometric and potentiometric modes of operation are directly comparable and the block circuit diagram shown in FIG. 3 applies almost without modification for both techniques.

The process according to the present invention is easily incorporated into automatic coating processes. The pilot sample 3 in such processes simultaneously serves as an identification for racks in which the surface area of the workpieces is not known. Only those racks will automatically pass through the additional treatment baths while all racks in which the surface area of the workpieces is known can pass these baths by.

Racks in which the surface area of the workpieces has been determined according to the present method can have the measured result associated to them for the further process steps in the form of an identification, for example a code, which is particularly easy with automatic process control employing memories, so that further process steps can then be performed under optimum conditions.

The preceding description of the present invention is susceptible to various modifications, changes and adaptations, as is readily apparent to those skilled in the subject art.

I claim:

1. A process for determining the surface area of a workpiece in which the entire surface of the workpiece is smooth which comprises: forming a removable coating of a metal or a metal compound on the entire workpiece surface by immersing the workpiece in a coating composition to obtain a coated workpiece, removing the coating from the workpiece surface by covering the coated workpiece with a coating-removal composition, at least one of the compositions selected from the group consisting of the coating composition and the coating-removal composition being a composition in which mass transfer is practically diffusion controlled, and comparing the quantity of coating removed by the coating removal composition to a standardized quantity of coating removed from a sample of known surface area, said standardized quantity having been obtained by coating the sample and removing the coating from the sample under the same conditions that were used to coat the workpiece and remove the coating from the workpiece.

2. A process according to claim 1 which comprises immersing the workpiece for a fixed period of time in a coating-composition solution in which mass transfer is virtually entirely diffusion controlled.

3. A process according to claim 1 which comprises covering the coated workpiece for a fixed period of time with a coating-removal composition in which mass transfer is essentially diffusion controlled.

4. A process according to claim 2 which comprises covering the coated workpiece for a fixed period of time with a coating-removal composition in which mass transfer is effectively diffusion controlled.

5. A process according to claim 1 which comprises pretreating the workpiece to make its surface homogeneous and smooth before the coating is applied thereto.

6. A process according to claim 1 which comprises chemically pretreating the workpiece to make its surface homogeneous and smooth before the coating is applied thereto.

7. A process according to claim 1 which comprises electrolytically pretreating the workpiece to make its surface homogeneous and smooth before the coating is applied thereto.

8. A process according to claim 2 wherein applying the coating comprises chromating.

9. A process according to claim 2 wherein applying the coating comprises reductive deposition.

10. A process according to claim 9 wherein the reductive deposition is chemical copper plating, nickel plating, silver plating, gold plating or tin plating.

11. A process according to claim 3 wherein the coating-removal composition is solvent in foam form.

12. A process according to claim 5 which comprises determining the quantity of coating removed by the coating-removal composition by measuring coating-composition concentration in said coating-removal composition after removing the coating from the workpiece surface.

13. A process according to claim 12 which comprises measuring coating-composition concentration photometrically.

14. A process according to claim 12 which comprises measuring coating-composition concentration potentiometrically.

15. A process according to claim 5 which comprises determining the quantity of coating composition removed from the workpiece surface by mass determination.

16. A process according to claim 15 wherein the mass determination is titratin.

17. A process according to claim 16 wherein the mass determination is precipitation.

18. A process according to claim 16 wherein the mass determination is colorimetry.

19. A process according to claim 1 which comprises:
a. fastening at least one workpiece and a pilot sample on a rack the pilot sample having a known surface area;
b. applying a coating of the coating composition to cover the surfaces of each workpiece and of the pilot sample;
c. removing the coating from each workpiece surface by immersing each workpiece in coating-removal composition in a first bath of known volume;
d. removing the coating from the pilot sample surface by immersing the pilot sample in a second bath of known volume and of the same coating-removal composition;
e. measuring the concentration of coating composition in the coating-removal composition of the second bath;
f. calibrating a coating-composition concentration-measuring instrument in surface area units based on the known surface area of the pilot sample, the known volumes of the first and second baths and the measured concentration of coating composition in the coating-removal composition of the second bath; and
g. measuring the concentration of coating composition in the coating-removal composition of the first bath with the coating composition concentration-measuring instrument.

20. A process according to claim 1 which comprises:
a. fastening at least one workpiece and a pilot sample on a rack, the pilot sample having a known surface area;
b. applying a coating of the coating composition to cover the surfaces of each workpiece and of the pilot sample;
c. removing the coating from each workpiece surface by immersing each workpiece in coating-removal composition in a first bath of known volume;
d. removing the coating from the pilot sample surface by immersing the pilot sample in a second bath of known volume and of the same coating-removal composition;
e. measuring respective optical density values for the first bath and for the second bath after removing the coating from each workpiece and from the pilot sample;
f. calibrating a measuring instrument in surface area units based on the known surface area of the pilot sample, the known volumes of the first and second baths and a quotient of the respective extinction values; and
g. determining the quotient and obtaining the corresponding workpiece surface area from the measuring instrument.

21. A process according to claim 2 wherein applying the coating comprises phosphating.

22. A process according to claim 2 wherein applying the coating comprises burnishing.

23. A process according to claim 2 wherein applying the coating comprises oxaling.

24. A process according to claim 2 wherein applying the coating comprises immersion silver plating.

25. A process according to claim 2 wherein applying the coating comprises immersion gold plating.

26. A process according to claim 2 wherein applying the coating comprises immersion tin plating.

27. A process according to claim 2 wherein applying the coating comprises immersion copper plating.

28. The process as defined in claim 1 wherein the metal compound is a salt.

* * * * *